(12) United States Patent
Christensen

(10) Patent No.: US 8,464,424 B2
(45) Date of Patent: Jun. 18, 2013

(54) AUTOMOTIVE ENGINE COOLING PIPE APPARATUS AND METHOD OF USE

(76) Inventor: Hans Martin Christensen, Escondido, CA (US)

( * ) Notice: Subject to any disclaimer, the term of this patent is extended or adjusted under 35 U.S.C. 154(b) by 0 days.

(21) Appl. No.: 13/009,674

(22) Filed: Jan. 19, 2011

(65) Prior Publication Data

US 2011/0109080 A1    May 12, 2011

Related U.S. Application Data

(60) Provisional application No. 61/409,068, filed on Nov. 1, 2010.

(51) Int. Cl.
  *B21K 3/00*     (2006.01)
  *F16L 15/02*   (2006.01)

(52) U.S. Cl.
  USPC ......................................... 29/888.01; 285/32

(58) Field of Classification Search
  USPC ................ 29/521, 888.01, 426.1, 428, 455.1, 29/525.01, 525.11, 402.01, 402.03, 402.15; 285/32, 302, 31
  See application file for complete search history.

(56) References Cited

U.S. PATENT DOCUMENTS

| | | |
|---|---|---|
| 3,699,934 A | 10/1972 | Gaipo et al. |
| 3,907,334 A | 9/1975 | Schera, Jr. |
| 3,994,516 A | 11/1976 | Fredd |
| 4,012,061 A | 3/1977 | Olson |
| 4,066,281 A | 1/1978 | De Bonis |
| 5,823,578 A | 10/1998 | Chiou |

*Primary Examiner* — John C Hong
(74) *Attorney, Agent, or Firm* — Mind Law Firm, P.C.; Jeromye V. Sartain; Justin G. Sanders

(57) ABSTRACT

A method of using an automotive engine cooling pipe apparatus for fluid-conducting installation within an engine block of an engine comprising a front tube having a proximal portion configured for at least partially slidably and sealably engaging a front sealing ring seated within a front opening of the engine block, and a rear tube telescopically engaged with the front tube and having a distal portion configured for at least partially slidably seating within a rear opening of the engine block, whereby expansion of the cooling pipe apparatus within the engine block seats the proximal and distal portions of the front and rear tubes within the respective front and rear openings of the engine block and so provides sliding and rotational resistance thereby stabilizing the installation of the cooling pipe apparatus within the engine block.

9 Claims, 5 Drawing Sheets

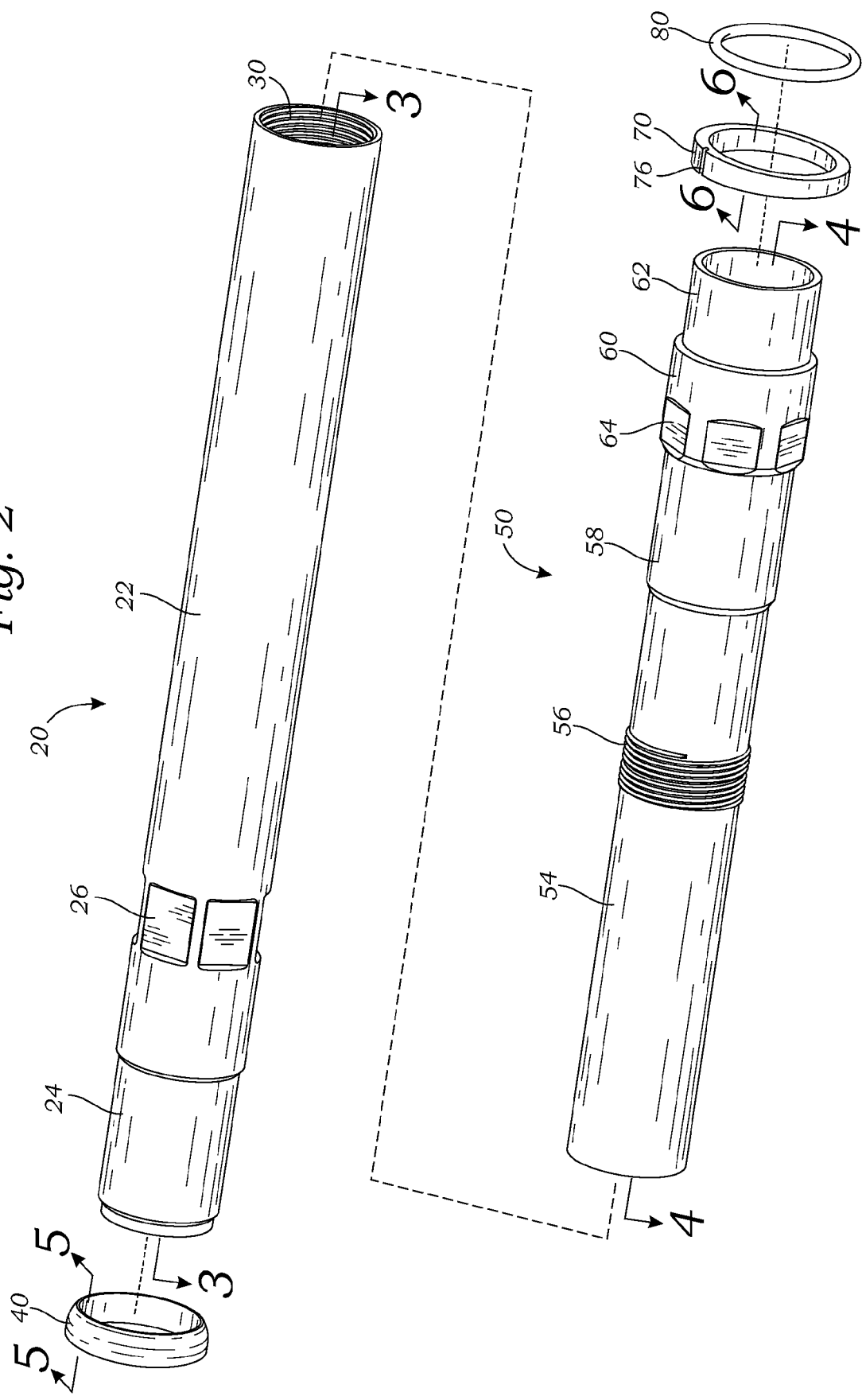

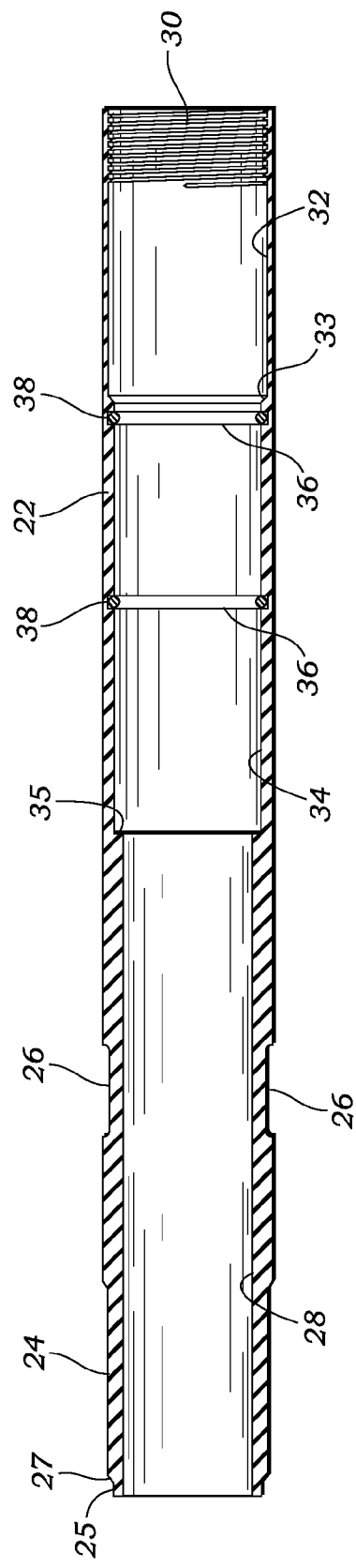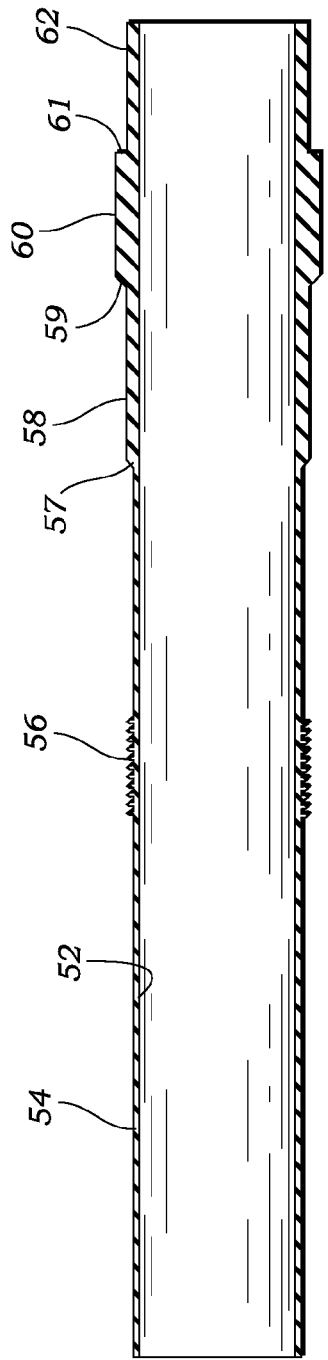

AUTOMOTIVE ENGINE COOLING PIPE APPARATUS AND METHOD OF USE

RELATED APPLICATIONS

This application claims priority and is entitled to the filing date of U.S. Provisional application Ser. No. 61/409,068 filed Nov. 1, 2010, and entitled "Automotive Engine Cooling Pipe Apparatus and Method of Use." The contents of the aforementioned application are incorporated by reference herein.

INCORPORATION BY REFERENCE

Applicant hereby incorporates herein by reference any and all U.S. patents and U.S. patent applications cited or referred to in this application.

BACKGROUND OF THE INVENTION

1. Field of the Invention

Aspects of this invention relate generally to automotive parts, and more particularly to an improved automotive engine cooling pipe.

2. Description of Related Art

The subject of this patent application is an improved automotive engine cooling pipe particularly configured for installation in engines wherein such a cooling pipe is originally factory-installed. Typically such cooling pipes must be installed axially or in a lengthwise direction from the front of the engine, making installation extremely labor-intensive, as compared to being able to somehow install such pipes laterally from above. The present invention meets this need and solves other related problems as described in more detail herein.

By way of background, and in more detail regarding the problem addressed by the automotive engine cooling pipe apparatus and method of use of the present invention, particularly in the "N62" engine manufactured by BMW and installed primarily in that automaker's "7 series" sedans from 2002 to present, as shown in Table 1 below, the engine is configured with an approximately 17" long×1⅜" diameter extruded aluminum cooling pipe that traverses the engine block from front to back and seals at each end for the purpose of delivering coolant therethrough from the water pump to the rest of the engine. The factory-installed cooling pipe or transfer tube as well as any such replacement part (BMW part #11-14-1-339-975) is again a single extrusion tube that also has a pre-installed gasket-type seal at one end configured to seat and seal within the opening in the front end of the engine block into which the cooling pipe is installed, substantially between the engine block and the timing cover. This gasket is essentially bonded to the pipe outside surface as through a vulcanization process or the like. Over time, whether through failure to regularly replace the coolant or simply through normal "wear and tear," the seal fails as its material just breaks down and corrosion underneath the seal around the pipe propagates and compromises the seal at that surface. Eventually, coolant is able to get by the factory-installed seal about the front end of the cooling pipe and will leak into the back area of the engine timing cover and out of a small ¼" hole in front of the timing cover. In order to repair this leak, the cooling pipe must be removed and replaced, requiring disassembly of much of the engine, including the intake manifold, water pump, valley pan, valve covers, timing covers, and timing assembly, the entire job then typically requiring on the order of 60-70 man-hours and so being quite expensive. In a bit more detail, due to the relative "net fit" of the cooling pipe within the engine block and it not having sufficient rearward axial movement to gain access to the failed front seal without removing the pipe, the only way to get to that seal is to either access the pipe from the front of the engine, requiring removal of the valve and timing covers and timing assembly, or to cut the pipe in half and remove it in two parts. While this second alternative saves the labor of disassembling much of the front of the engine, that must still be done anyway in order to install the new factory cooling pipe and seal. Accordingly, using the BMW cooling pipe or transfer tube to repair this coolant leak necessitates the time-consuming and expensive removal and reassembly of much of the front of the engine.

TABLE 1

| | |
|---|---|
| 2002-2005: | BMW 745I & IL (E65 & E66) |
| 2006-2008: | BMW 750I & IL (E65 & E66) |
| 2004-2006: | BMW X5 4.4i/4.8is (E53) |
| 2007-2010: | BMW X5 4.8i (E70) |
| 2004-2005: | BMW 545i (E60) |
| 2006-2010: | BMW 550i (E60 & E61) |
| 2004-2005: | BMW 645Ci (E63 & E64) |
| 2006-2010: | BMW 650i (E63 & E64) |
| 2002-2005: | Range Rover |

The following art defines the present state of this field:

U.S. Pat. No. 3,699,934 to Gaipo et al. is directed to an extensible lubricant-return tube, for enclosing a pushrod in an internal combustion engine, having gaskets at the opposite ends of the tube and comprising an outer sleeve and an inner insert. The outer sleeve is internally smooth and the inner insert is externally threaded in the area where it telescopes into the sleeve. A pair of internally threaded locking torroids disposed on the inner insert serve to adjust and lock the sleeve and insert to the required length.

U.S. Pat. No. 3,907,334 to Schera, Jr. is directed to a telescopic conduit nipple having a cylindrical outer tubular member with a linear slot therein parallel the axis thereof. One end of the outer member having an integral outer flange terminates in a male thread of predetermined pitch and length. An inner cylindrical tubular member slidably fitted for predetermined coaxial linear adjustment within the outer member with the outer end thereof having a coaxial outer flange terminates in a male thread of predetermined pitch and length includes screw means through the slot and threaded into said inner member for locking the adjusted length of the nipple.

U.S. Pat. No. 3,994,516 Fredd is directed to a threaded interconnect structure incorporating respective matching internal and external threaded portions of members to be threadedly interconnected, with the thread geometry defining a profile having contiguous straight-thread and tapered-thread sections. Sealing integrity and make-up length and sealing predictability of the threaded interconnection are improved over standard tapered-thread joints. Tapered sections have a taper in excess of standard taper-threaded profiles and comprise comparatively fewer threads, with the sealing action in the tapered section being mechanically aided by the straight-thread sections during make-up of the joint, and thereafter mechanically reinforced by the straight-thread sections. A tool chaser of new and novel design permits cutting straight-tapered profile transitions with maintenance of pitch and thread matching.

U.S. Pat. No. 4,012,061 to Olson is directed to a dual conduit drill stem member that includes a pipe having two piece tube therewithin affixed to the pipe at outer ends and inner ends coupled by a composite elastomeric sleeve and telescopic metal coupling, adjacent members being connected by threaded tool joints on pipe ends and compression sealed telescopic joints on tube outer ends.

U.S. Pat. No. 5,823,578 to Chiou is directed to an extensible metallic tube structure that has a big hollow tube, an engaging head, a small hollow tube, a locating column, an O-shaped ring, a washer, a C-shaped fixing device, and a controlling sleeve. The big hollow tube has an inwardly indented groove at the upper periphery engaged with the engaging head at one end. The small hollow tube fixed with locating column is led through the other end of the big hollow tube. In sequence, the O-shaped ring, the washer, the C-shaped fixing device and the controlling sleeve are led through the upper end of the small hollow tube. The controlling sleeve is screwed up to the engaging head via threads. An inner protruding flange defining the other side of the inwardly indented groove of the big hollow tube will prevent the small hollow tube from coming off when it is extended to the extreme. And via the controlling sleeve generating a pushing force when screwed up to the engaging head, the C-shaped fixing device will clamp tightly against the small hollow tube to locate the small hollow tube into position when the tube is being adjusted. In addition, the C-shaped fixing means will abut closely against the washer and the washer tightly against the O-shaped ring to provide a secure connection of the big and small hollow tubes, so that the water will not flow downwards or leak outwardly at the joint when the big and small hollow tubes are adjusted and uplifted to supply water for cleaning purpose.

The prior art described above teaches an extensible lubricant-return tube for internal combustion engines, a linear adjustable telescopic nipple, a telescoping pipe coupling with improved pressure seal connection threads, a dual conduit drill stem member, and an extensible metallic tube structure, but does not teach an automotive engine cooling pipe apparatus for fluid-conducting installation with an engine block of an engine laterally or "from above" as facilitated by a telescoping, tube-in-tube construction of the apparatus. Aspects of the present invention fulfill these needs and provide further related advantages as described in the following summary.

SUMMARY OF THE INVENTION

Aspects of the present invention teach certain benefits in construction and use which give rise to the exemplary advantages described below.

Generally, aspects of the present invention are directed to an automotive engine cooling pipe apparatus for fluid-conducting installation with an engine block of an engine comprising a front tube having a proximal portion configured for at least partially slidably and sealably engaging a front sealing ring seated within a front opening of the engine block, a rear tube telescopically received within the front tube and having a distal portion configured for at least partially slidably seating within a rear opening of the engine block, and a means for securing the relative positions of the telescoping front and rear tubes in a substantially expanded configuration of the apparatus, whereby expansion of the cooling pipe apparatus within the engine block seats the proximal and distal portions of the front and rear tubes within the respective front and rear openings of the engine block and so provides axial tension thereby stabilizing the installation of the cooling pipe apparatus within the engine block.

A primary objective inherent in the above described apparatus and method of use is to provide advantages not taught by the prior art.

Another objective is to provide such an apparatus that further comprises a tapered crush ring slidably installed on the distal portion of the rear tube so as to substantially evenly compress a rear o-ring against the engine block about the rear opening.

A further objective is to provide such an apparatus wherein a female thread portion is formed on the front tube and a male thread portion is formed on the rear tube and configured to threadably engage the female thread portion, whereby engagement of the female thread portion with the male thread portion and rotation of the front and rear tubes relative to one another causes selective contraction and expansion of the cooling pipe apparatus, the male and female thread portions thus cooperating with the crush ring and rear o-ring to provide axial tension and sliding and rotational resistance and thereby further stabilize the installation of the cooling pipe apparatus within the engine block.

A still further objective is to provide such an apparatus wherein the front tube is formed having a first enlarged bore that steps down to a second enlarged bore, the second enlarged bore is formed having two spaced-apart o-ring grooves, and two engagement o-rings are positioned within the o-ring grooves and configured to seal between the front tube and the rear tube when the front and rear tubes are telescopically assembled to form the cooling pipe apparatus, thereby preventing any fluid from passing between the second enlarged bore of the front tube and a rear outer wall of the rear tube when the apparatus is in use.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 2 is an exploded perspective view thereof;

FIG. 3 is a cross-sectional view of an outer front tube thereof;

FIG. 4 is a cross-sectional view of an inner rear tube thereof;

DETAILED DESCRIPTION OF THE INVENTION

Figure 1:
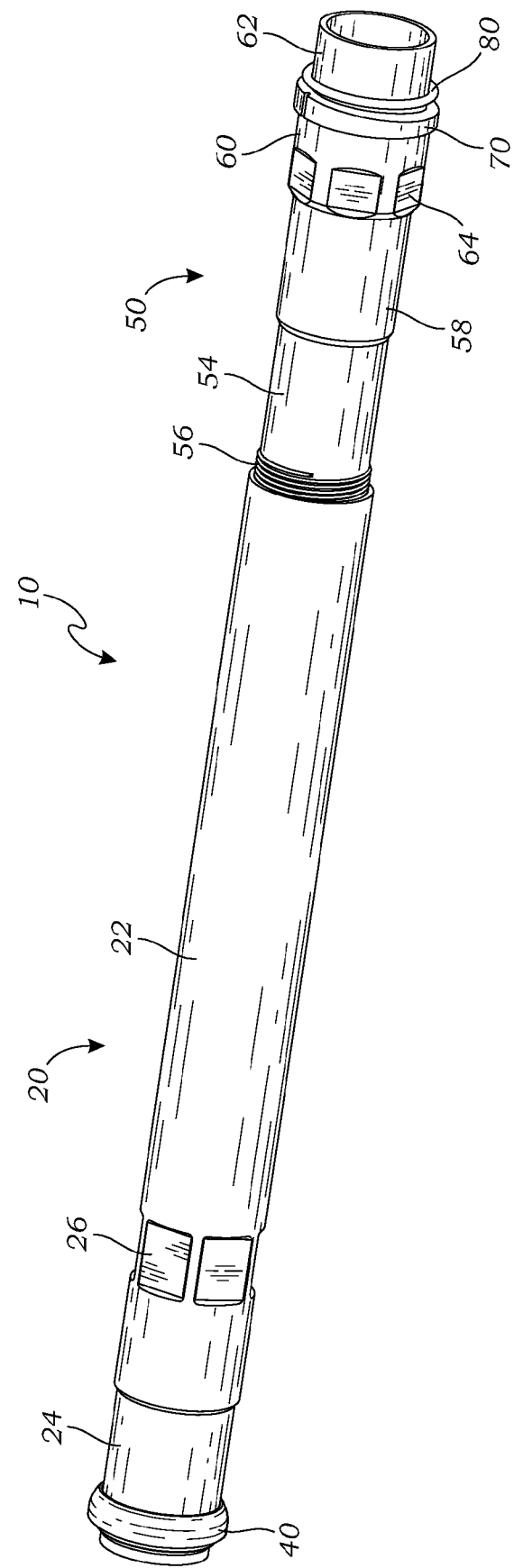
FIG. 1 is a perspective view of an exemplary embodiment of the automotive engine cooling pipe apparatus of the present invention.

The above described drawing figures illustrate aspects of the invention in at least one of its exemplary embodiments, which are further defined in detail in the following description.

Generally, the automotive engine cooling pipe apparatus of the present invention addresses the above-described problem and others by essentially providing a telescoping or collapsible and expandable tube-in-tube cooling pipe construction that enables the pipe to be sufficiently shortened so as to be installed "from above" and then, once in position, lengthened to properly seat and seal at opposite ends within an engine block. As such, the telescoping cooling pipe or transfer tube of the present invention enables repair of a coolant leak in an engine employing such cooling pipes through replacement of the failed seal and the associated pipe by accessing the necessary engine block area without removal of the valve and timing covers and timing assembly, thereby providing tremendous labor savings. It will be appreciated that while the telescoping automotive engine cooling pipe is thus described in the context of solving a specific problem associated with a particular engine design, the invention is not so limited. Rather, the expandable tube-in-tube pipe design with seals can be employed in any context wherein it is advantageous to laterally rather than axially insert such a pipe in fluid communication within existing or fixed structure.

In more detail now concerning the construction of the automotive engine cooling pipe apparatus 10 according to aspects of the present invention, referring first to the perspective assembly view of FIG. 1, the apparatus 10 generally comprises a front tube 20 and a rear tube 50 slidably and threadably engaged along a substantially common axis so as to allow the overall pipe apparatus 10 to be elongated or shortened as needed, more about which is said below in connection with FIGS. 7 and 8 demonstrating the apparatus 10 in use. In the exemplary embodiment, the front and rear tubes 20, 50 and the crush ring 70 are formed of 6061-T6 aluminum as through an extrusion and machining process, though any other suitable material and method of manufacture may be employed without departing from the spirit and scope of the present invention. The apparatus 10 is further configured in the exemplary embodiment with a molded front sealing ring 40 positioned on the proximal end of the front tube 20 and a crush ring 70 backing a rear o-ring 80 at the distal end of the rear tube 50, the function of which will also be described in more detail below. At the outset, it is to be understood that while particular constructions of the components of the pipe apparatus 10 are shown and described herein, such as their size and shape and material, the invention is not so limited. Rather, any appropriate geometries and materials now known or later developed to suit a particular application may be employed in the present invention without departing from its spirit and scope. As such, it is noted that the particular dimensional and material call-outs throughout this application are merely illustrative of aspects of the present invention and so are non-limiting. Furthermore, it is to be understood that the drawings illustrating aspects of the present invention are not necessarily to scale and so are not to be taken strictly or as providing dimensional information except where noted.

Turning to FIG. 2, there is now shown an exploded perspective view of the same exemplary pipe apparatus 10 of FIG. 1 whereby the five major components of the assembly are more clearly visible and sectional views thereof as shown and described further below in connection with FIGS. 3-6 can be more readily taken.

Referring next to FIG. 3, there is shown a detailed cross-sectional view of the front tube 20 of the pipe apparatus 10 according to aspects of the present invention. The front outer wall 22 is of a substantially constant outside diameter except for a stepped-down proximal portion 24 on which the front sealing ring 40 seats. The proximal portion 24 terminates proximally in a stepped-down nose portion 25 that in the exemplary embodiment is transitioned to from the proximal portion 24 by way of a chamfer 27. The nose portion 25 is configured for seating against the timing cover (not shown) when the pipe apparatus 10 is installed as shown and described below in connection with FIGS. 7 and 8. Optional front flats 26 may be machined or otherwise formed in the front outer wall 22 for the purpose of grasping the front tube 20 with a wrench or other tool, particularly when trying to loosen or shorten a previously-installed pipe apparatus 10, as when it is to be removed from the engine. The front inner wall 28 is formed at its distal end with an internal or female thread portion 30 configured to threadably engage or mate with the corresponding external or male thread portion 56 formed on the rear tube 50 (FIG. 4). Proximal of the female threaded portion 30 is a first enlarged bore 32 that steps down to a second enlarged bore 34 that itself steps down to the inside diameter of the front inner wall 28, the step-down from the first enlarged bore 32 to the second enlarged bore 34 being a roughly forty-five degree front chamfer 33 and that from the second enlarged bore 34 to the front inner wall 28 being an abrupt front shoulder 35 of roughly ninety degrees, more about which will be said below regarding the finished pipe apparatus 10 in use. As further shown in FIG. 3, the second enlarged bore 34 includes two spaced-apart o-ring grooves 36 in which are positioned two engagement o-rings 38 configured to seal generally between the front tube 20 and the rear tube 50 when assembled together "tube-in-tube"; specifically, the engagement o-rings 38, seated within the second enlarged bore 34, seal against the rear outer wall 54 of the rear tube 50 proximal of the male thread portion 56 (FIG. 3) when the female and male thread portions 30, 56, respectively, are engaged, thereby preventing any fluid from passing between the O.D. of the rear tube 50 and the I.D. of the front tube 20 when the two are slid together to form the pipe apparatus 10 as illustrated in FIGS. 1 and 2. In the exemplary embodiment, the engagement o-rings 38 are Viton® Fluoroelastomer or EPDM Peroxide Cured o-rings having nominal dimensions of 1 3/16" inside diameter, 1 3/8" outside diameter, and 3/32" wall thickness, though again it will be appreciated that any suitable material or o-ring dimension, and corresponding groove dimension, now known or later developed may be substituted.

Turning to FIG. 4, there is shown a detailed cross-sectional view of the rear tube 50 of the pipe apparatus 10 as configured to operatively engage with the front tube 20 shown in FIG. 3 as further illustrated in the perspective views of FIGS. 1 and 2. The rear tube 50 is formed with a substantially constant diameter rear inner wall 52 and with a rear outer wall 54 that includes a number of further features. First, some distance from the proximal end of the rear tube 50 there is formed in the rear outer wall 54 an external or male thread portion 56 configured to threadably engage or mate with the female thread portion 30 formed in the front tube 20. In the exemplary embodiment, the thread form of each is a 1 3/8"-20 thread, though once more it will be appreciated that any thread form or other mechanical means for non-permanent mechanical engagement of the front and rear tubes 20, 50 may be employed in the pipe apparatus 10 of the present invention without departing from its spirit and scope. Distal of the male thread portion 56 is a step-up to a first outer surface 58 and then to a still larger outside diameter second outer surface 60, each transition, namely, from the rear outer wall 54 to the first outer surface 58 and from the first outer surface 58 to the second outer surface 60, having first and second rear chamfers 57, 59 of roughly forty-five degrees. Stepping down from the second outer surface 60 to a stepped-down distal portion 62 of the rear tube 50 is a transition defining a distally-facing rear shoulder 61 of roughly ninety degrees so as to provide a proximal stop for the crush ring 70 (FIG. 6), more about which is said below regarding the pipe apparatus 10 in use. Again, between the crush ring 70 and the distal end of the rear tube 50 there is also positioned a rear o-ring 80 (FIG. 1), which in the exemplary embodiment is again made of a Viton® Fluoroelastomer or EPDM Peroxide Cured material having nominal dimensions of 1 1/4" inside diameter, 1 1/2" outside diameter, and 1/8" wall thickness. As with the front tube 20, the outer rear wall 52, and specifically here the second outer surface 60, may be formed having rear flats 64 for the purpose of grasping the rear tube 50 with a wrench or other tool.

Figure 5:
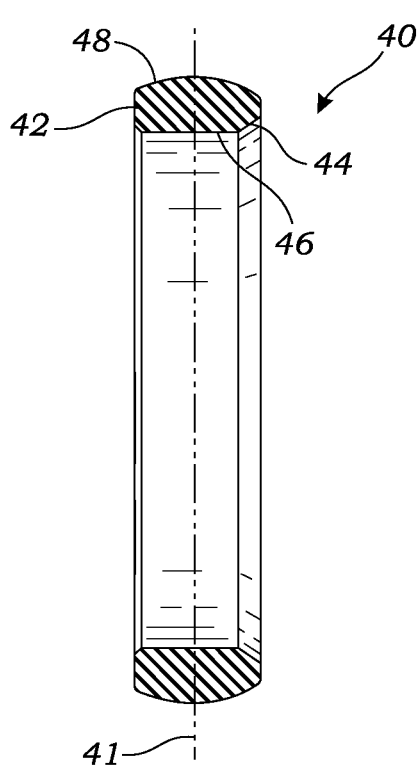
FIG. 5 is a cross-sectional view of a front sealing ring thereof.

Referring next to FIG. 5, there is shown a cross-sectional view of the front sealing ring 40, illustrating the profile and dimensions of the exemplary sealing ring 40 as configured to seat on the stepped-down proximal portion 24 of the front tube 20 (FIG. 3). Once more, the front sealing ring 40 is in the exemplary embodiment formed of Viton® Fluoroelastomer or EPDM Peroxide Cured, such material having good wear properties in the heat and corrosive environment of the engine, though again any suitable material now known or later developed may be employed. In the exemplary embodiment, the annular front sealing ring 40 has a nominal outside diameter of approximately 0.030" greater than comparable o-rings or seals for the same engine block opening, thereby creating a greater crush or interference fit and, thus, a greater seal that, by virtue of the Viton® material selected and the overall improvements to the cooling pipe 10 of the present invention yield a relatively longer-lasting, more stable seal as well. The profile or cross-section of the front sealing ring 40 as shown in FIG. 5, by design, is unsymmetrical about a vertical or radial mid-plane 41, versus being symmetrical about a horizontal or axial mid-plane. As such, the front sealing ring 40 is formed having a proximally-facing relatively flat side 42 that, in use, is configured to be positioned facing towards the front of the car or toward the timing cover (not shown) so as to abut thereagainst. Opposite the flat side 42, the sealing ring 40 is formed with a countersink 44 in its central bore 46 that serves to help guide the proximal portion 24, and particularly the nose portion 25, of the front tube 20 into the sealing ring bore 46 during installation of the pipe apparatus 10 as described below in connection with FIGS. 7 and 8. With continued reference to FIG. 5, the resulting profile of the front sealing ring 40 is such that the curved outer circumferential surface 48 is also unsymmetrical from front to back, or from the side of the sealing ring 40 having the countersink 44 to the opposite flat side 42 of the sealing ring 40.

Figure 6:
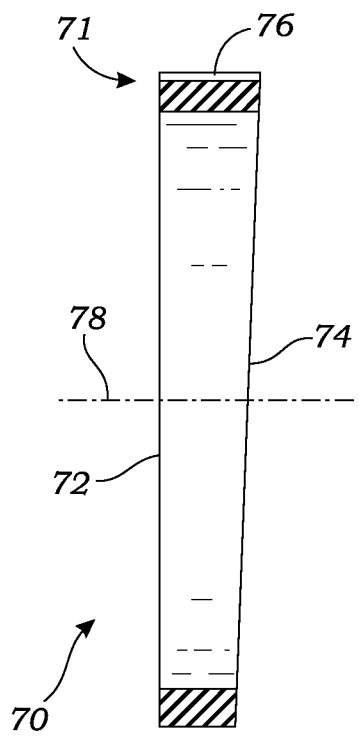
FIG. 6 is a cross-sectional view of a rear crush ring thereof.

Turning now to FIG. 6, there is shown a cross-section view of the crush ring 70 that in use is positioned on the stepped-down distal portion 62 of the rear tube 50 so as to abut the rear shoulder 61 (FIG. 4). The crush ring 70 is shown as having a tapered profile defined by a proximal crush ring surface 72 that is substantially perpendicular to the axis 78 of the crush ring 70 and an opposite distal crush ring surface 74 that is at an angle of approximately four degrees from perpendicular, or approximately ninety-four degrees from the axis or mid-plane 78 of the crush ring 70. As such, the crush ring 70 is formed with an axial wall thickness, or a thickness of the crush ring 70 in an axial direction, that is not constant, going from thinnest at the point where the four degree angle is acute and meets the perimeter of the crush ring 70 at its bottom, or the furthest point below the mid-plane 78 of the crush ring 70, to thickest at the point where the four degree angle is obtuse and meets the perimeter of the crush ring 70, or the furthest point above the mid-plane 78 of the crush ring 70, thereby defining a thickest profile side 71 of the crush ring 70. In this way, it will be appreciated that the crush ring 70 is configured to seat on its proximal side substantially flush with the rear shoulder 61 of the rear tube 50 and to seat on its distal side substantially flush with a tapered surface having a nominal four-degree inclination. More particularly, while the cast surface of the engine block of most N62 engines in which the exemplary pipe apparatus 10 is to be installed may vary slightly from run to run and engine to engine, it has been determined that a roughly four degree taper on the distal surface 74 of the crush ring 70 substantially flushes that surface 74 with the distal wall 93 of the engine block 90, and more particularly, substantially evenly squeezes the rear o-ring 80 against such a four-degree nominally tapered engine block surface 93, and particularly, the mouth about the rear opening 94, so as to sufficiently and uniformly compress the o-ring 80 and thereby keep a compressive load on the overall pipe apparatus 10 to hold it in place within the engine block, the o-ring 80 further serving to take up any slight expansion or contraction of the pipe apparatus 10, whether by relative movement between the front and rear tubes 20, 50, or by thermal effects on the parts. Those skilled in the art will appreciate that all such geometrical considerations are merely illustrative in connection with a particular vehicle engine installation according to aspects of the pipe apparatus 10 of the present invention and that, accordingly, such features may vary as appropriate to the context, such that the dimensions shown and described are to be understood as exemplary and expressly non-limiting. To assist the user in locating and orienting the large or axially-thickest profile side 71 of the crush ring 70, or the point on the perimeter of the crush ring 70 where the obtuse four-degree taper terminates, there is formed a notch or other such marking 76 for visual alignment, more about which is said immediately below regarding the pipe apparatus 10 in use.

In use, once more, the automotive engine cooling pipe apparatus 10 according to aspects of the present invention is configured in the exemplary embodiment as a telescoping or collapsible and expandable tube-in-tube construction enabling the repair of a coolant leak in an N62-type BMW engine through replacement of the failed seal and associated pipe by conveniently accessing the necessary engine block area "from above." More specifically, then, in view of the details of the replacement cooling pipe apparatus 10 as shown and described in connection with FIGS. 1-6, the operable installation of the apparatus 10 is accomplished by the below described and illustrated steps, which again those skilled in the art will appreciate are merely illustrative of one exemplary means of installing and using the pipe apparatus 10 in the context of a particular engine; other configurations of the apparatus 10 and steps involved in its installation and use are thus possible without departing from the spirit and scope of the invention.

To first prep the engine for installation of the cooling pipe apparatus 10 as shown and described in FIGS. 1-6, after removing the engine's intake cam adjuster units, left & right, the intake manifold, the water pump, the valley pan/cover, and the vibration dampener, the exposed cooling tube is cut in half and the rear portion is removed by hand (none of which is shown). Then, a hole is drilled in the front part of tube. Next, the front portion of the old cooling tube is pulled out of the front end of the engine block with a lever bar positioned in the hole drilled in the previous step. Then, the old front seal (not shown) is removed from the front hole in the engine block with a pick-tool or other such tool. Similarly, the old rear o-ring in the back of the engine block is also removed, and then both the front and rear grooves (not shown) are cleaned out and prepped for the new installation. A new factory o-ring (not shown) is inserted into the rear engine block o-ring groove, and now the engine block, having the old cooling pipe and seals removed, is ready for installation of the cooling pipe apparatus 10 of the present invention.

The next step, and the first in installing the cooling pipe apparatus 10, is to install the engine block seal or front sealing ring 40 (FIGS. 1 and 2). In the exemplary context of the N62 engine, the front sealing ring 40 is positioned within a groove (not shown) in the front opening 92 of the engine block 90, between the engine block 90 and the timing cover (not shown). It is noted particularly from FIG. 5 that the profile or cross-section of the front sealing ring 40, by design, is not symmetrical. As such, the relatively flat side 42 of the sealing ring 40 should be facing towards the front of the car or toward the timing cover when installed in the engine block 90. It will thus be appreciated that the front sealing ring 40 shown on the front tube 20 particularly in the assembly view of FIG. 1 thus depicts the apparatus 10 in its installed configuration, though such sealing ring 40 is preferably to be removed and separately installed in the engine block 90 first and then the remainder of the pipe apparatus 10 installed, as shown in FIG. 7, the stepped-down proximal portion 24 of the front tube 20 then seating within the so positioned front sealing ring 40 located in the front wall of the engine block 90 as then shown in FIG. 8. Once the sealing ring 40 is completely installed as described above, preferably by hand or, as necessary, using a blunt tool to push the sealing ring 40 in place, being careful not to damage it, the engine block 90 is ready for installation of the tube-in-tube replacement cooling pipe apparatus 10.

Figure 7:
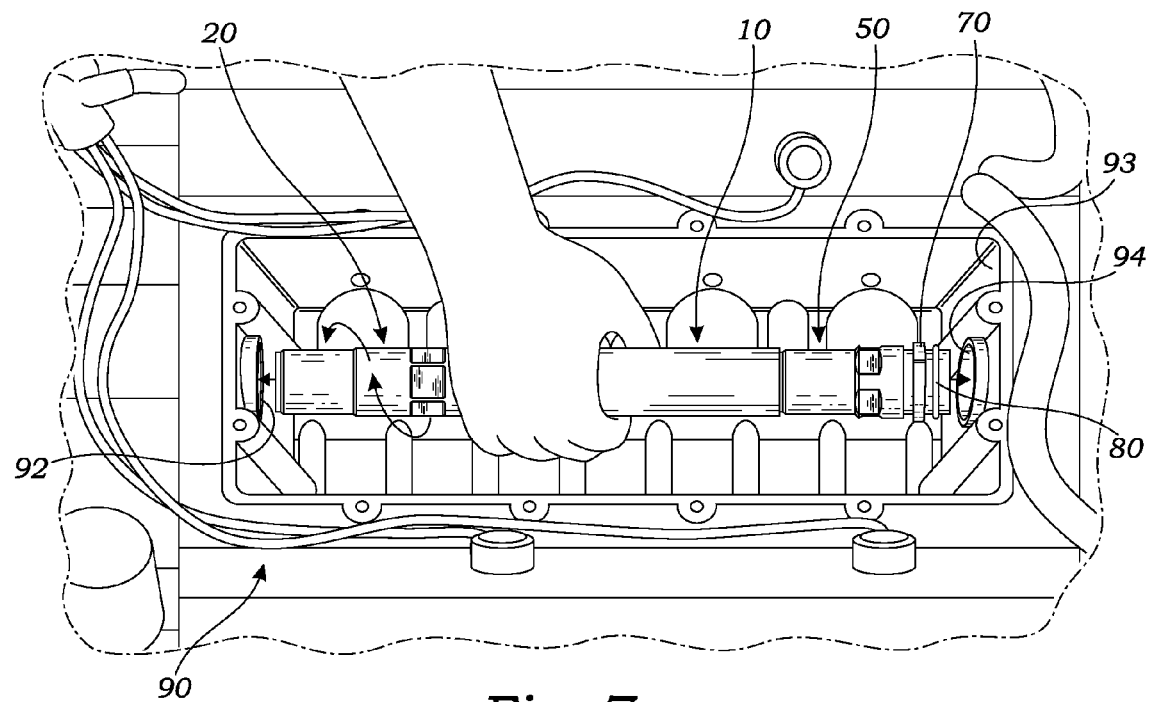
FIG. 7 is a schematic view thereof in a first operational position.

With reference then to FIG. 7, installation begins with the cooling pipe apparatus 10 collapsed, with the female and male thread portions 30, 56, of the front and rear tubes 20, 50, respectively (FIGS. 1-4), disengaged such that the tubes slide axially relative to and toward one another until the proximal end of the rear tube 50, in the area of the rear outer wall 54 slides through the second enlarged bore 34 until it substantially butts up against the front shoulder 35, the rear tube 50 being further guided into the second enlarged bore 34 by the front chamfer 33 transition from the first enlarged bore 32 to the second enlarged bore 34 (FIGS. 3 and 4). Once in this substantially fully collapsed state as illustrated in FIG. 7, which in the exemplary embodiment is a length of approximately 15¾", or any such intermediate collapsed state as necessary for insertion into the engine block 90 "from above," and with the opposite ends lubed as with white grease or the like, the pipe apparatus 10 is then lowered into the engine block 90 such that the proximal portion 24 (FIG. 3) of the front tube 20 and the distal portion 62 (FIG. 4) of the rear tube 50 having the crush ring 70 and the rear o-ring 80 thereon are substantially adjacent the respective front and rear engine block holes 92, 94. Next, the rear or distal portion 62 of the rear tube 50 is inserted into the rear opening 94 of the engine block, being careful to orient the marking 76 (FIGS. 2 and 6) of the crush ring 70 facing substantially upward as shown.

Figure 8:
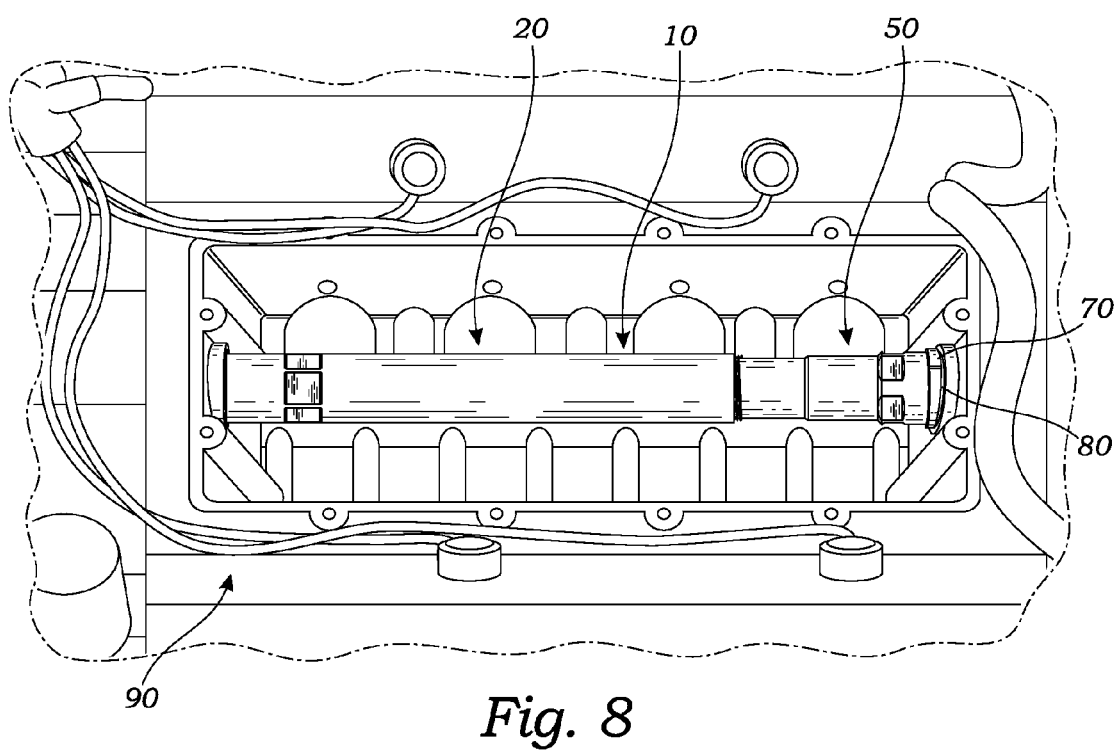
FIG. 8 is a schematic view thereof in a second operational position.

Then, holding one of the front tube 20 and rear tube 50 in each hand, the front tube 20 is slid proximally until proximal portion 24 of the front tube 20 begins to enter the front opening 92 of the engine block 90 and the thread portions 30, 56 (FIGS. 3 and 4), of the front and rear tubes 20, 50, respectively, engage, and then the front and rear tubes 20, 50 are hand-turned relative to one another so as to begin to expand the pipe apparatus 10 and cause the front or proximal end of the front tube 20 to enter or seat further within the opening 92 in the front of the engine block 90 and, particularly, the already-positioned front sealing ring 40, being careful to observe and correct as necessary so that the sealing ring 40 is not pinched, and the rear or distal end of the rear tube 50 to enter or seat further within the opening 94 in the rear of the engine block with the rear o-ring 80 thereby squeezed between the crush ring 70 and the mouth of the rear opening 94 of the engine block 90, all as shown in FIG. 8 illustrating the cooling pipe apparatus 10 as fully installed in use in the illustrative context. It will be appreciated that the two engagement o-rings 38 seated within the grooves 36 formed in the second enlarged bore 34 of the front tube 20 and sealing against the rear outer wall 54 of the rear tube 50 (FIGS. 3 and 4) serve to provide axial tension or sliding resistance as well as rotational resistance, in conjunction with the front and rear engine block seals, such that the pipe apparatus 10 is in a sense pre-loaded and, once in position within the engine block 90, has positive sealing on the front and rear ends and thereby prevents or minimizes any tendency of the threads to back off or the pipe apparatus 10 to collapse or shorten, further securing the sealing properties of the pipe apparatus 10. Once a positive installation and seal is assured, the engine components may be reassembled and the vehicle operated. It will again be appreciated by those skilled in the art that such a cooling pipe apparatus 10 with its tube-in-tube telescoping action and its associated method of use thus enables a "from above" installation within the engine block 90, saving the time and expense of much more disassembly and reassembly of the front of the engine in order to make the coolant system leak repair of the exemplary context. It will be further appreciated once again that numerous other configurations and uses according to aspects of the present invention are possible without departing from its spirit and scope.

To summarize, regarding the exemplary automotive engine cooling pipe apparatus and method of use of the present invention as employed in connection with a BMW N62 engine, it will be appreciated that a device is provided for telescoping or collapsible and expandable tube-in-tube operation enabling the repair of a coolant leak through replacement of the failed seal and associated pipe by conveniently accessing the necessary engine block area "from above," thereby avoiding numerous additional man-hours of labor in removing and replacing the conventional single-tube cooling pipe. Because the principles of the invention may be practiced in a number of configurations beyond that shown and described, it is to be understood that the invention is not in any way limited by the exemplary embodiment, but is generally directed to an expandable tube-in-tube pipe design with seals that can be employed in any context wherein it is advantageous to laterally rather than axially insert such a pipe in fluid communication within existing or fixed structure and so is able to take numerous forms to do so without departing from the spirit and scope of the invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method of installing an automotive engine cooling pipe apparatus within an engine block of an engine for fluid conduction therethrough, comprising the steps of:
    seating a front sealing ring temporarily separated from the apparatus within a front opening of the engine block;
    telescopically collapsing the apparatus as by shifting a front tube of the apparatus and a rear tube of the apparatus telescopically engaged with the front tube axially toward one another, whereby the overall length of the apparatus is shortened;
    positioning the collapsed apparatus within the engine block such that a proximal portion of the front tube is substantially adjacent the front opening of the engine block and a distal portion of the rear tube having a crush ring slidably installed thereon is substantially adjacent an opposite rear opening of the engine block, the crush ring having a proximal crush ring surface that is substantially perpendicular to the axis of the crush ring, the proximal crush ring surface being configured to selectively substantially abut a distally-facing rear shoulder of the rear tube, and further having a distal crush ring surface opposite the proximal crush ring surface that is at an obtuse angle from the axis of the crush ring, whereby the crush ring is formed having a tapered profile, the distal crush ring surface being configured to selectively substantially abut a tapered distal wall of the engine block about the rear opening thereof;

telescopically expanding the apparatus as by shifting the front and rear tubes axially away from one another, whereby the overall length of the apparatus is increased and the proximal portion of the front tube enters and seats within the front opening of the engine block, sealing within the front sealing ring, and the distal portion of the rear tube enters and seats within the rear opening of the engine block; and clamping the crush ring between the distally-facing rear shoulder of the rear tube and the tapered distal wall of the engine block adjacent the rear opening so as to cooperate in securing the relative positions of the telescoping front and rear tubes of the expanded apparatus and thereby stabilize the installation of the apparatus within the engine block during use.

2. The method of claim 1 wherein the step of telescopically collapsing the apparatus further comprises first threadably disengaging a female thread portion of the front tube from a male thread portion of the rear tube and then sliding the front and rear tubes axially toward one another until a rear outer wall of the rear tube enters a second enlarged bore of the front tube.

3. The method of claim 2 wherein the step of telescopically expanding the apparatus further comprises reengaging the female thread portion of the front tube with the male thread portion of the rear tube and then rotating the front and rear tubes relative to one another.

4. The method of claim 1 comprising the further step of substantially upwardly aligning a marking formed on the crush ring to visually identify and substantially upwardly orient a thickest profile side of the crush ring defined by the point on the perimeter of the crush ring where the obtuse angle terminates prior to clamping the crush ring in place between the distally-facing shoulder of the rear tube and tapered distal wall of the engine block.

5. A method of installing an automotive engine cooling pipe apparatus within an engine block of an engine for fluid conduction therethrough, comprising the steps of:

seating a front sealing ring temporarily separated from the apparatus within a front opening of the engine block, the front sealing ring having a proximally-facing relatively flat side, a central bore therethrough having a countersink formed therein substantially opposite the flat side, and a curved outer circumferential surface so as to define an unsymmetrical profile of the front sealing ring about a radial mid-plane thereof, the flat side of the front sealing ring being oriented away from a distal wall of the engine block, whereby the front sealing ring is configured to slidably receive and seal against the proximal portion of the front tube when the front sealing ring is seated within the front opening of the engine block;

telescopically collapsing the apparatus, whereby the overall length of the apparatus is shortened;

positioning the collapsed apparatus within the engine block such that a proximal portion of a front tube of the apparatus is substantially adjacent the front opening of the engine block and a distal portion of a rear tube of the apparatus is substantially adjacent an opposite rear opening of the engine block; and telescopically expanding the apparatus, whereby the overall length of the apparatus is increased and the proximal portion of the front tube enters and seats within the front opening of the engine block, passing through the central bore as guided therein by the countersink and sealing within the front sealing ring, and the distal portion of the rear tube enters and seats within the rear opening of the engine block.

6. The method of claim 5 comprising the further step of clamping a crush ring slidably installed on the distal portion of the rear tube of the apparatus between a distally-facing rear shoulder of the rear tube and a tapered distal wall of the engine block about the rear opening thereof, the crush ring having a proximal crush ring surface that is substantially perpendicular to the axis of the crush ring, the proximal crush ring surface being configured to selectively substantially abut the distally-facing rear shoulder of the rear tube, and further having a distal crush ring surface opposite the proximal crush ring surface that is at an obtuse angle from the axis of the crush ring, whereby the crush ring is formed having a tapered profile, the distal crush ring surface being configured to selectively substantially abut the tapered distal wall of the engine block about the rear opening thereof so as to cooperate in securing the relative positions of the telescoping front and rear tubes of the expanded apparatus and thereby stabilize the installation of the apparatus within the engine block during use.

7. The method of claim 6 comprising the further step of, prior to clamping the crush ring in place between the distally-facing shoulder of the rear tube and tapered distal wall of the engine block, substantially upwardly aligning a marking formed on the crush ring to visually identify and substantially upwardly orient a thickest profile side of the crush ring defined by the point on the perimeter of the crush ring where the obtuse angle terminates.

8. The method of claim 5 wherein the step of telescopically collapsing the apparatus comprises the steps of:

threadably disengaging a female thread portion of the front tube from a male thread portion of the rear tube; and sliding the front and rear tubes axially toward one another until a rear outer wall of the rear tube enters a second enlarged bore of the front tube.

9. The method of claim 8 wherein the step of telescopically expanding the apparatus comprises the steps of:

reengaging the female thread portion of the front tube with the male thread portion of the rear tube; and rotating the front and rear tubes relative to one another.

* * * * *